(12) United States Patent
Lu

(10) Patent No.: US 6,895,637 B2
(45) Date of Patent: May 24, 2005

(54) ELASTIC HINGE FOR A NOTEBOOK COMPUTER

(75) Inventor: Sheng-Nan Lu, Shulin Chen (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 246 days.

(21) Appl. No.: 10/264,138

(22) Filed: Oct. 2, 2002

(65) Prior Publication Data

US 2004/0064919 A1 Apr. 8, 2004

(51) Int. Cl.$^7$ ................................................. E05F 1/08
(52) U.S. Cl. .......................... 16/285; 16/277; 16/304; 16/306
(58) Field of Search ................... 16/277, 285, 308, 16/307, 374, 289, 290, 280, 304, 306, 342; 361/680–683; 248/917–921

(56) References Cited

U.S. PATENT DOCUMENTS

| 4,215,449 | A | * | 8/1980 | Loikitz ........................... 16/50 |
| 5,037,231 | A | * | 8/1991 | Kitamura ....................... 403/120 |
| 5,771,539 | A | * | 6/1998 | Wahlstedt et al. ............ 16/285 |
| 5,873,847 | A | * | 2/1999 | Bennett et al. ................ 602/16 |
| 5,894,633 | A | * | 4/1999 | Kaneko ......................... 16/306 |
| 6,321,415 | B1 | * | 11/2001 | Frohlund ...................... 16/330 |
| 6,601,269 | B2 | * | 8/2003 | Oshima et al. ............... 16/342 |
| 6,671,929 | B1 | * | 1/2004 | Lu ................................. 16/342 |
| 2004/0074049 | A1 | * | 4/2004 | Kawamoto .................... 16/256 |

* cited by examiner

Primary Examiner—Chuck Y. Meh
Assistant Examiner—Michael J Kyle
(74) Attorney, Agent, or Firm—Dellett & Walters

(57) ABSTRACT

An elastic hinge for a notebook computer is composed of a shaft, a barrel, a pintle and a torsional spring. The shaft and the barrel are secured on a body of the computer. The pintle extends through the barrel and is secured on a monitor of the computer. The torsional spring is securely mounted between the shaft and the pintle. When the computer is closed, the torsional spring is twisted to provide an elastic force to open the monitor.

4 Claims, 7 Drawing Sheets

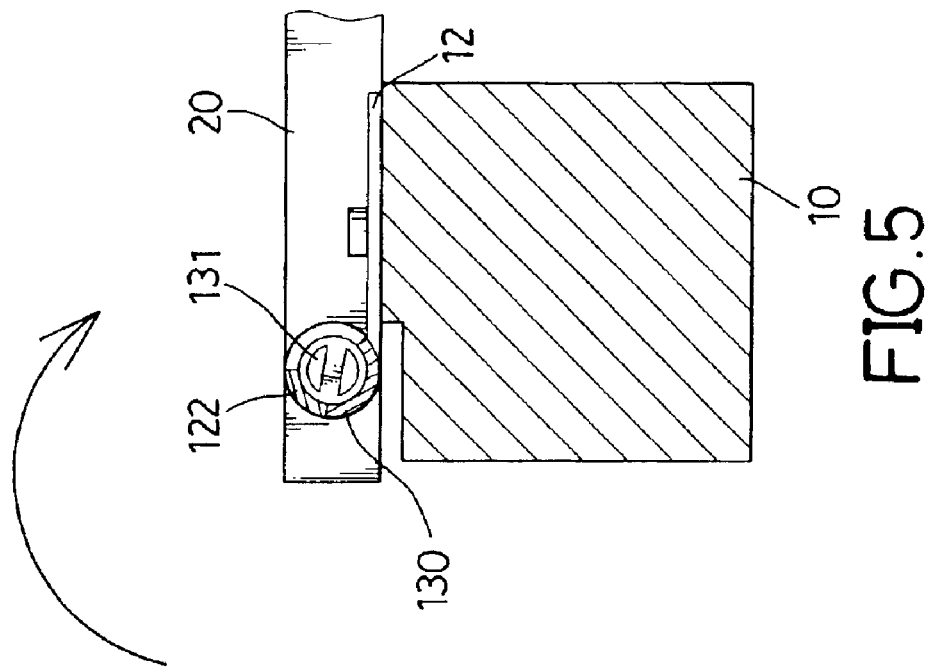
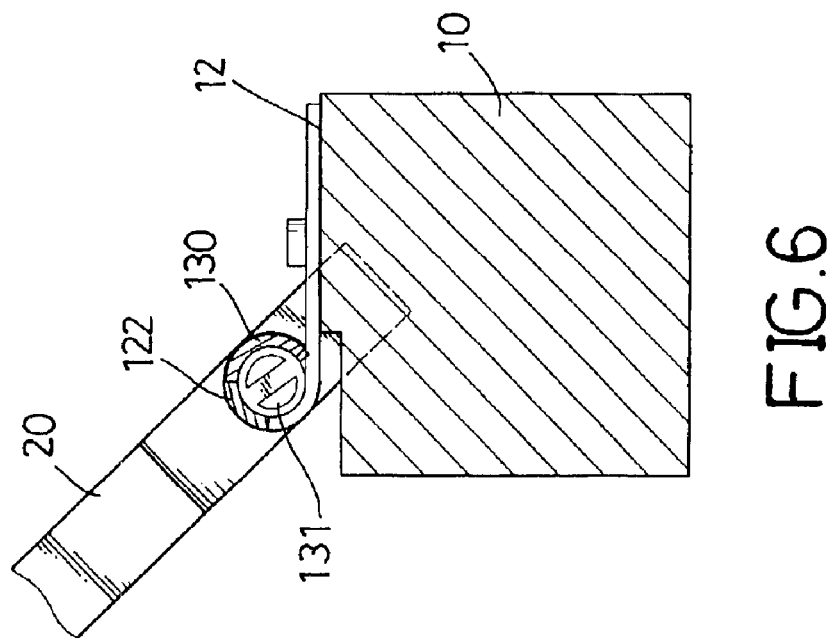

ELASTIC HINGE FOR A NOTEBOOK COMPUTER

BACKGROUND OF THE INVENTION

1. Field of the Invention

The present invention is related to an elastic hinge for a notebook computer, and more particularly to a hinge which has an elastic force to automatically raise a monitor from the body of the notebook computer.

2. Description of Related Art

A notebook computer comprises a body and a monitor pivotally mounted on the body by hinges. When the computer is closed, the monitor abuts the body and is fastened by a locking member.

However, the conventional hinge does not provide an elastic force to slightly raise the monitor when a user wants to open the computer, and the user may fumble in trying to separate the two hinged portions.

Therefore, the invention provides a hinge for a notebook computer to mitigate and/or obviate the aforementioned problems.

SUMMARY OF THE INVENTION

The main objective of the invention is to provide a hinge for a notebook computer which can provide an elastic force to slightly raise a monitor when a locking member of the computer is released.

Other objects, advantages and novel features of the invention will become more apparent from the following detailed description when taken in conjunction with the accompanying drawings.

BRIEF DESCRIPTION OF THE DRAWINGS

FIG. 5 is a side view of the hinge in a closed status;

FIG. 6 is a side view of the hinge in an open status;

DETAILED DESCRIPTION OF THE PREFERRED EMBODIMENT

Figure 1:
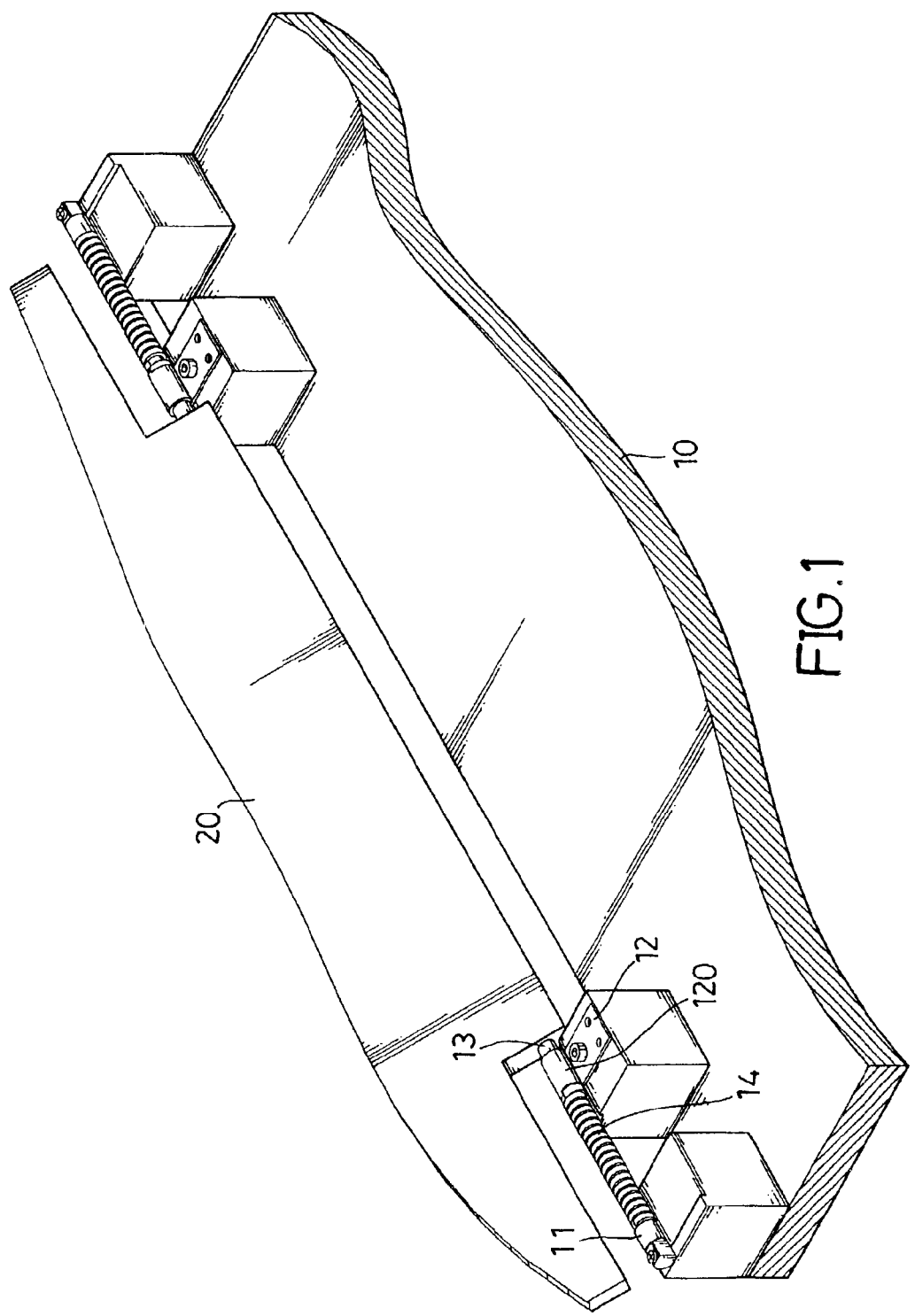
FIG. 1 is a partially perspective view of a notebook computer assembled with hinges in accordance with the invention.
Figure 2:
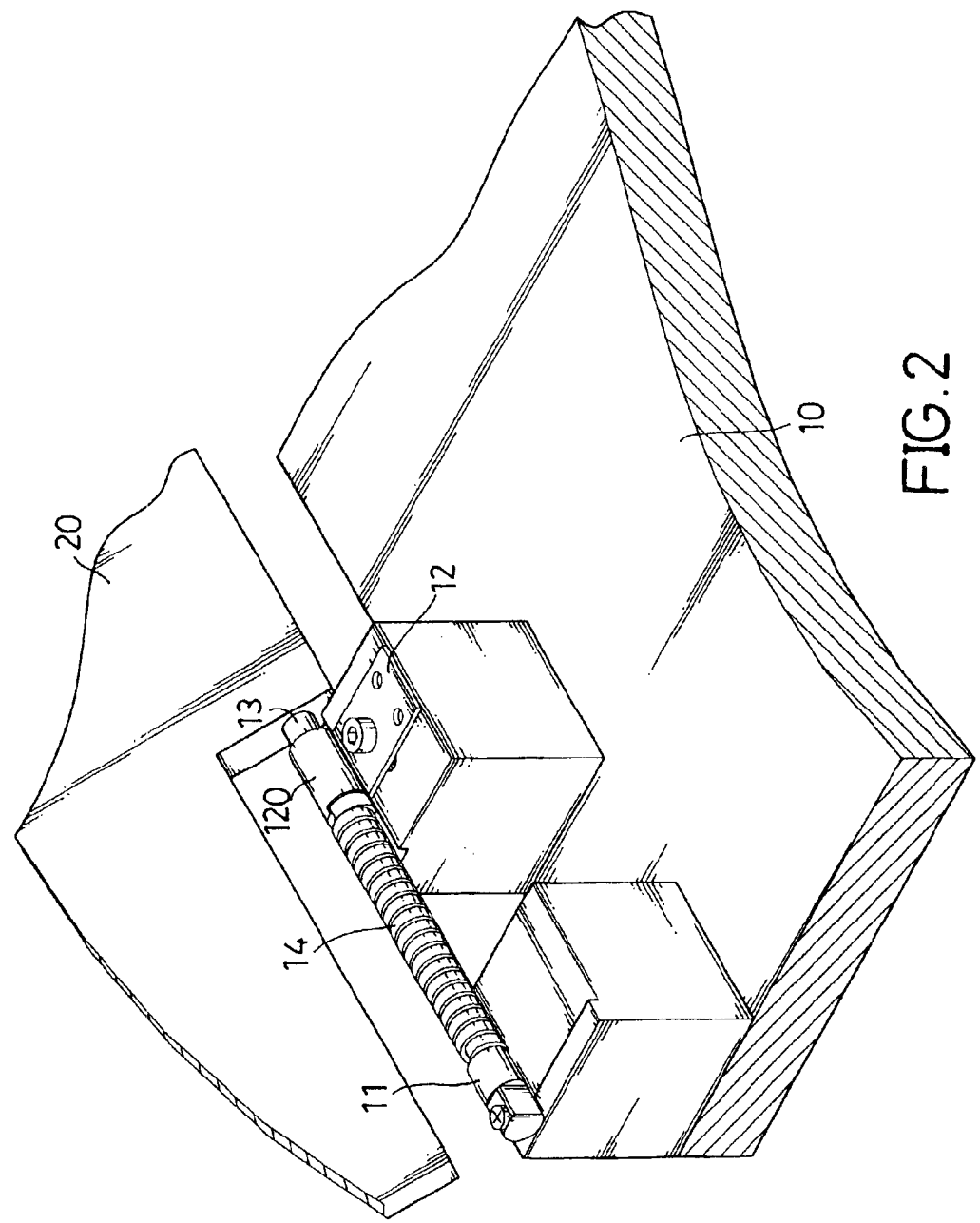
FIG. 2 is an enlarged perspective view of the hinge in accordance with the invention.
Figure 3:
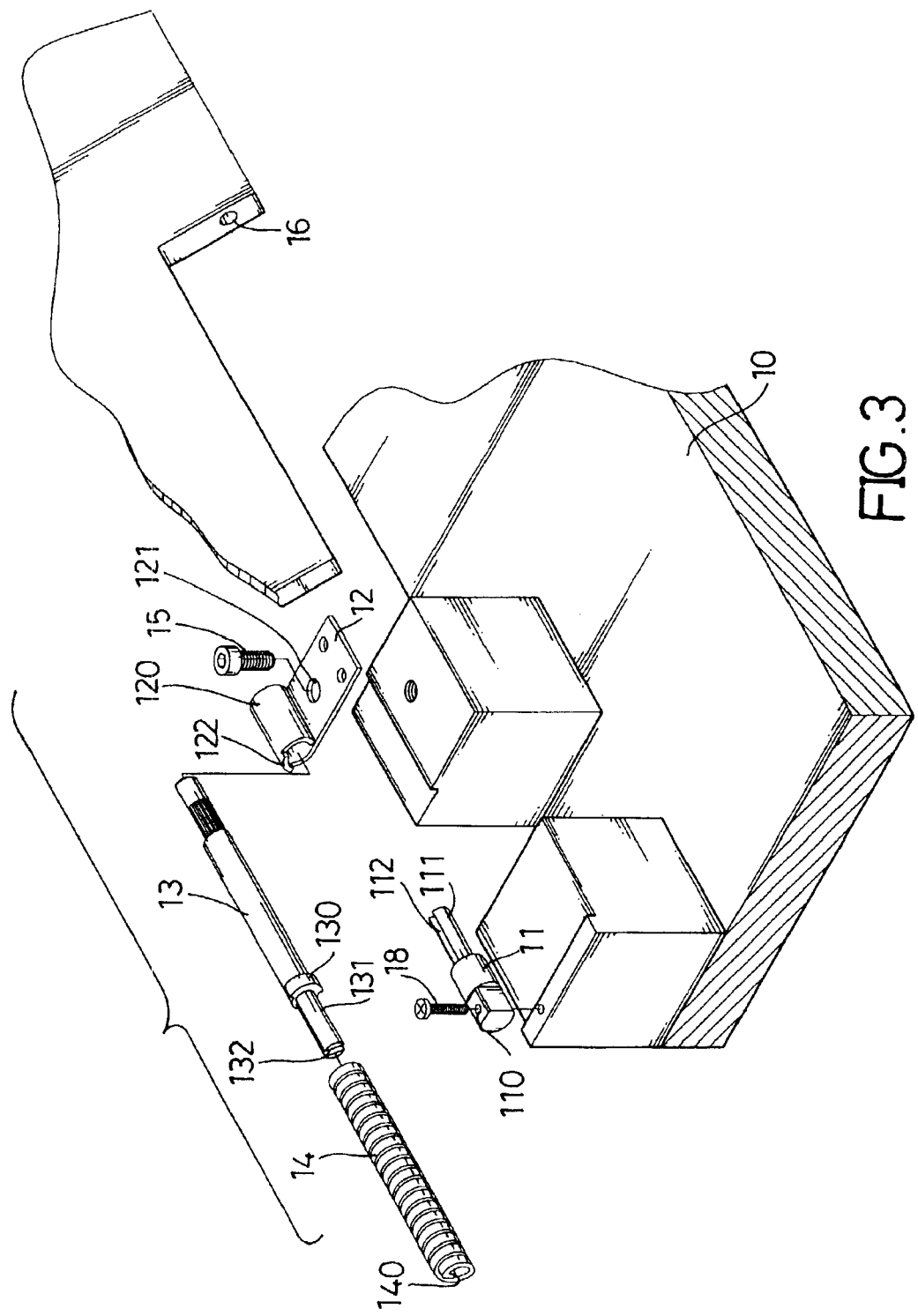
FIG. 3 is an exploded perspective view of the hinge in FIG. 2.

Referring to FIGS. 1–3, a notebook computer is composed of a body (10) and a monitor (20) pivotally mounted on the body (10) by two hinges.

The elastic hinge in accordance with the invention is composed of a shaft (11), a barrel (12), a pintle (13), and a torsional spring (14).

The shaft (11) has a first part (not numbered) and a second part (111) with a diameter smaller than a diameter of the first part. A first hole (110) is defined through the first part of the shaft (11), and a first screw (18) is inserted through the first hole (110) to securely mount the shaft (11) on the body (10). A first elongated slot (112) is longitudinally defined through the second part (111) of the shaft (11).

The barrel (12) has a plate (not numbered) and a tubular part (120) aligned with the shaft (11). A second hole (121) is defined through the plate of the barrel (12), and a second screw (15) is inserted through the second hole (121) to securely mount the barrel (12) on the body (10). An arcuate lug (122) is formed at an end of the tubular part (120) facing the shaft (11).

The pintle (13) has a first portion (not numbered) away from the shaft (11), a second portion (131) adjacent the shaft (11), and a middle portion (not numbered) between the first portion and the second portion. The first portion and the middle portion of the pintle (13) extend through the barrel (12). The first portion of the pintle (13) is securely inserted into an aperture (16) defined in the monitor (20) and aligned with the tubular part (120) of the barrel (12), and the middle portion of the pintle (13) is rotatably received in the tubular part (120). An arcuate protrusion (130) is formed at the middle portion of the pintle (13) and can abut the arcuate lug (122) when the monitor (20) is raised completely. A second elongated slot (132) is longitudinally defined through the second portion of the pintle (13).

The torsional spring (14) is mounted between the shaft (11) and the pintle (13), wherein the second part (111) of the shaft (11) and the second portion (131) of the pintle (13) are received in the torsional spring (14). Two ends (140) of the torsional spring (14) are securely located in the first elongated slot (112) and the second elongated slot (132) respectively.

Figure 4:
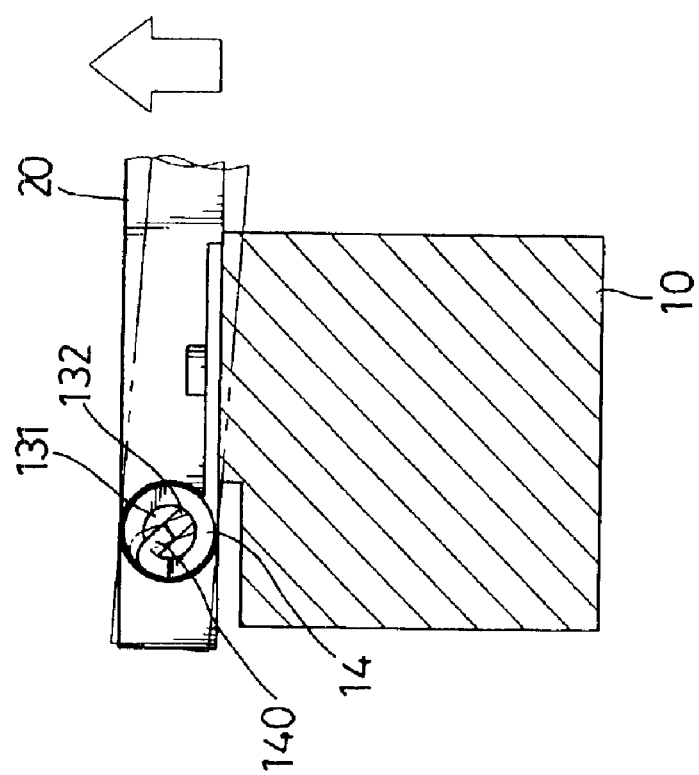
FIG. 4 is a side view of the hinge when a monitor of the computer is being closed.

Referring to FIGS. 4–6, because the pintle (13) is secured on the monitor (20) and one end (140) of the torsional spring (14) is secured on the pintle (13), when the monitor (20) is turned downwards to abut the body (10), the pintle (13) is rotated to twist the torsional spring (14). When a locking member (not shown or numbered) on the monitor (20) is released, the elastic force of the torsional spring (14) can slightly push the monitor (20) to pivot upwards, so that a user can easily and conveniently raise the monitor (20).

When the monitor (20) is abutted the body (10), a first side of the arcuate lug (122) can abut a first side of the arcuate protrusion (132). When the monitor (20) is raised completely, a second side of the arcuate lug (122) abuts a second side of the arcuate protrusion (132) to position the monitor (20).

Figure 7:
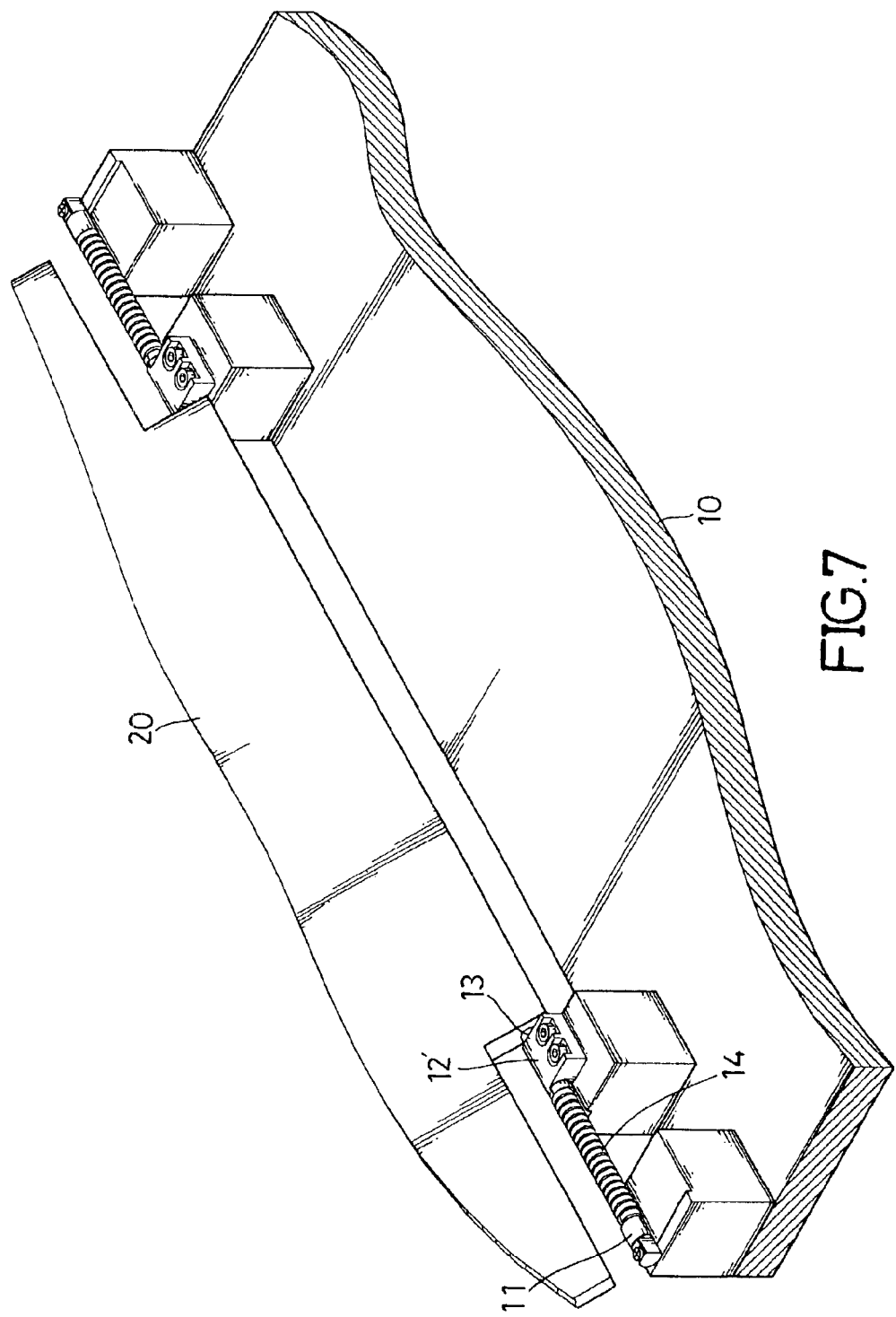
FIG. 7 is a perspective view of another embodiment of the hinge in accordance with the invention.
Figure 8:
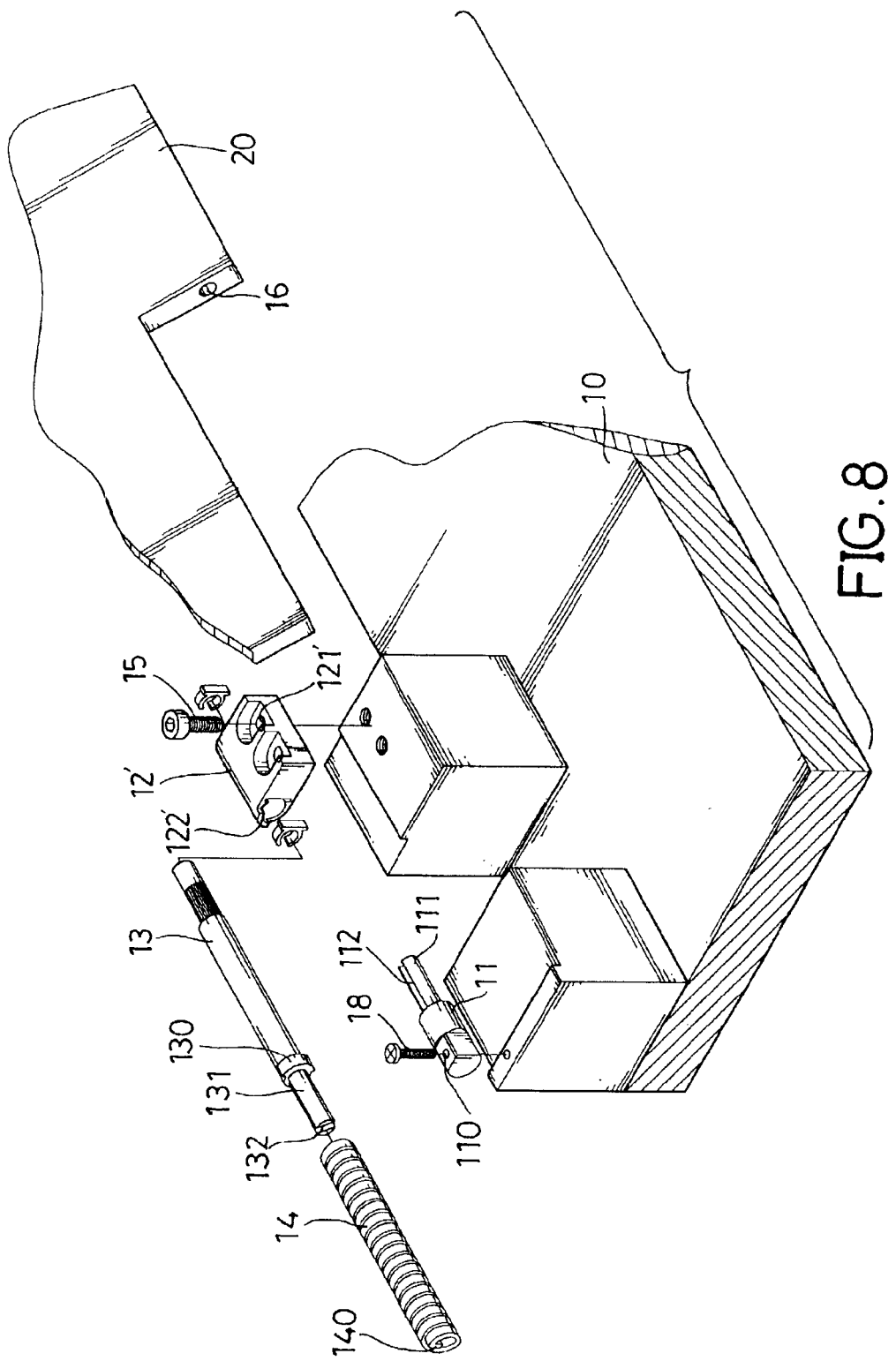
FIG. 8 is an exploded perspective view of the embodiment of the hinge in FIG. 7.

Referring to FIGS. 7–8, in another embodiment of the invention, the barrel (12) is replaced with a limit piece (12'). The limit piece (12') has at least one second hole (121') defined therethrough, and at least one second screw (15) is inserted through the second hole (121') to secure the limit piece (12') on the body (10). A passage (not numbered) is longitudinally defined through the limit piece (12') and aligned with the shaft (11). The arcuate lug (122') is formed around the passage on a side surface of the limit piece (12') facing the shaft (11). The pintle (13) extends through the passage of the limit piece (12'), and the arcuate protrusion (130) can abut the arcuate lug (122') when the monitor (20) is raised completely.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the inven-tion to the full extent indicated by the broad general meaning of the terms in which the appended claims are expressed.

What is claimed is:

1. An elastic hinge for a notebook computer, the notebook computer having a body (10) and a monitor (20), the hinge comprising:

a shaft (11) secured on the body (10) wherein the shaft (11) is composed of a first part and a second part (111), the first part having a first hole (110) defined through the first part, and a first screw (18) is inserted through the first hole (110) to secure the shaft (11) on the body (10), wherein the second part (111) has a first elongated slot (112) longitudinally defined through the second part (111);

a barrel (12) secured on the body (10), the barrel (12) having a tubular part (120) aligned with the shaft (11), wherein the barrel (12) has a plate with a second hole (121) defined through the plate; and a second screw (15) is inserted through the second hole (121) to secure the barrel (12) on the body (10);

a pintle (13) extending through the tubular part (120) of the barrel (12) and secured on the monitor (20) and aligned with the shaft (11); and a torsional spring (14) provided between the shaft (11) and the pintle (13), the torsional spring (14) having two ends (140) respectively secured on the shaft (11) and the pintle (13), wherein the pintle (13) is composed of a first portion away from the shaft (11) and extending through the tubular part (120) and secured on the monitor (20), a second portion (131) adjacent the shaft (11) having a second elongated slot (132) longitudinally defined through the second portion (131), and a middle portion between the first portion and the second portion (131) rotatably received in the tubular part (120);

wherein one end (140) of the torsional spring (14) is securely located in the first elongated slot (112) and the other end (140) of the torsional spring (14) is securely located in the second elongated slot (132).

2. The elastic hinge as claimed in claim 1, wherein the barrel (12) has an arcuate lug (122) formed at an end of the tubular part (120) facing the shaft (11); and the pintle (13) has an arcuate protrusion (130) formed on the middle portion thereof, which can abut the arcuate lug (122) when the monitor (20) is raised completely.

3. An elastic hinge for a notebook computer, the notebook computer having a body (10) and a monitor (20), the hinge comprising:

a shaft (11) secured on the body (10), wherein the shaft (11) is composed of a first part and a second part (111), the first part having a first hole (110) defined through the first part, and a first screw (18) is inserted though the first hole (110) to secure the shaft (11) on the body (10);

a limit piece (12') secured on the body (10), the limit piece (12') having a passage aligned with the shaft (11), wherein the limit piece (12') has at least one second hole (121') defined therethrough; and at least one second screw (15) is inserted through the second hole (121') to secure the barrel (12) on the body (10);

a pintle (13) extending through the passage of the limit piece (12') and secured on the monitor (20) and aligned with the shaft (11); and a torsional spring (14) provided between the shaft (11) and the pintle (13), the torsional spring (14) having two ends (140) respectively secured on the shaft (11) and the pintle (13), wherein the second part (111) has a first elongated slot (112) longitudinally defined through the second part (111); and one end (140) of the torsional spring (14) is securely located in the first elongated slot (112), wherein the pintle (13) is composed of a first portion away from the shaft (11) and extending through the passage of the limit piece (12') and secured on the monitor (20), a second portion (131) adjacent the shaft (11) having a second elongated slot (132) longitudinally defined through the second portion (131), and a middle portion between the first portion and the second portion (131) rotatably received in the passage; and the other end (140) of the torsional spring (14) is securely located in the second elongated slot (132).

4. The elastic hinge as claimed in claim 3, wherein the limit piece (12') has an arcuate lug (122') formed around the passage and on a side surface facing the shaft (11);

and the pintle (13) has an arcuate protrusion (130) formed on the middle portion thereof, which can abut the arcuate lug (122) when the monitor (20) is raised completely.

* * * * *